Oct. 18, 1966  J. J. FLANAGAN ETAL  3,279,561
LUBRICANT METERING MEANS FOR ROD END BEARINGS
Filed April 23, 1964  2 Sheets-Sheet 1
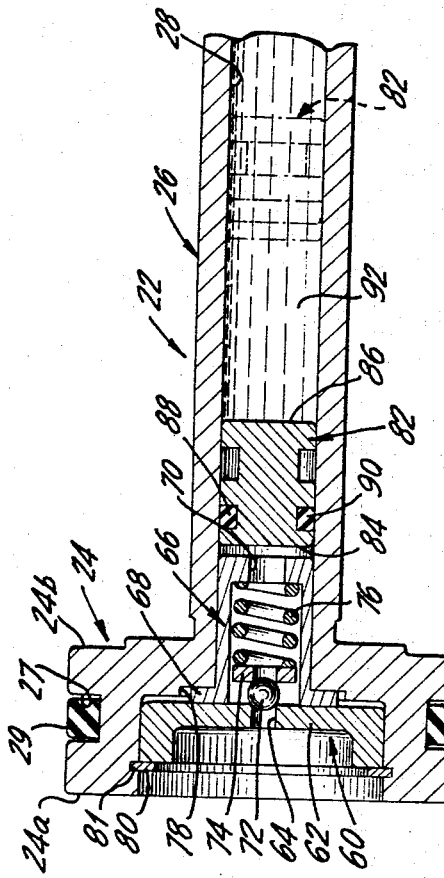
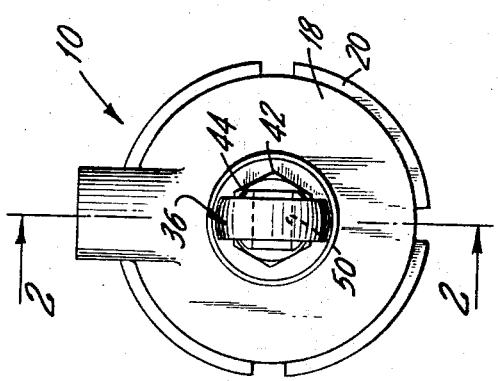
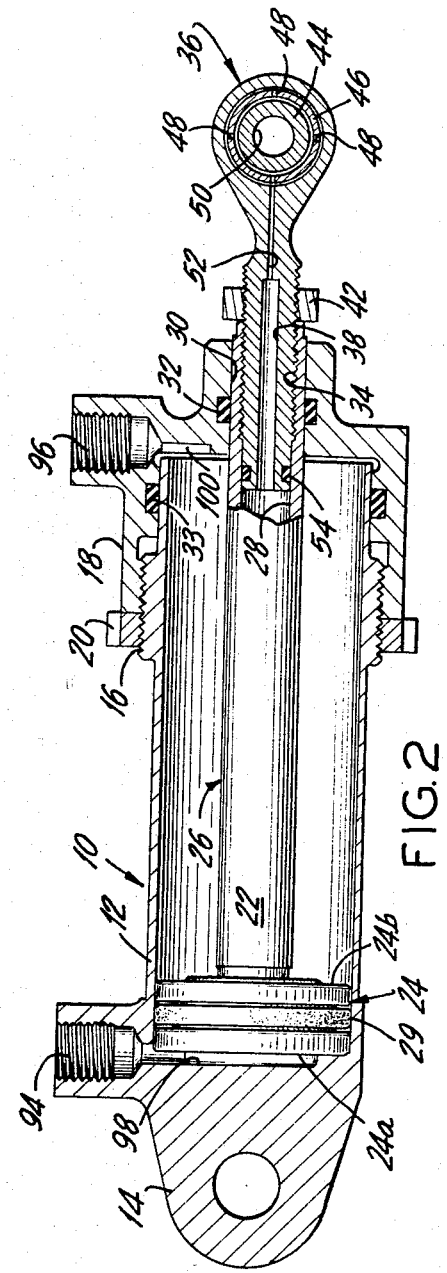
INVENTORS.
JAMES J. FLANAGAN
BY ALBERT R. McCLOSKEY
Leonard H. King
ATTORNEY

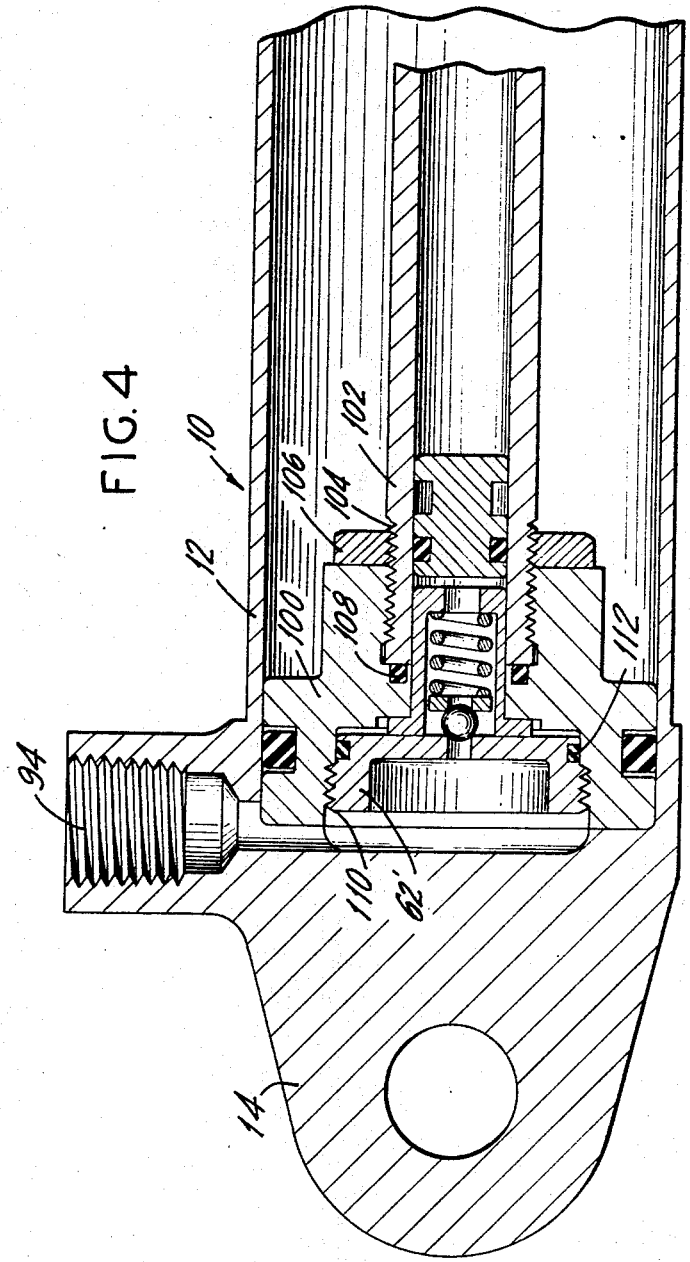
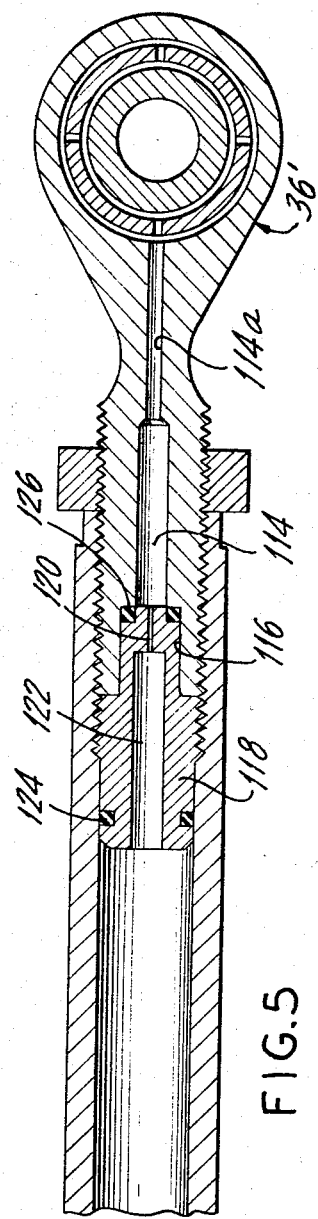
INVENTORS.
JAMES J. FLANAGAN
BY ALBERT R. McCLOSKEY
Leonard H. King
ATTORNEY

United States Patent Office 3,279,561
Patented Oct. 18, 1966

3,279,561
LUBRICANT METERING MEANS FOR
ROD END BEARINGS
James J. Flanagan, 54 Birchwood Drive, Rhinebeck, N.Y., and Albert R. McCloskey, 67 Mona Terrace, Fairfield, Conn.
Filed Apr. 23, 1964, Ser. No. 362,068
11 Claims. (Cl. 184—24)

This invention relates to actuating cylinders and more particularly to lubricant metering means integral therewith.

Hydraulically actuated power cylinders are commonly used today in machinery designed to displace or translate a particular component from one position to another. Bearings are usually provided at the external end of the cylinder's piston rod. Typically, bearing types for this application include needle bearings, ball bearings and spherical sleeve bearings. To assure continuous, trouble free operation of the machinery, it is essential that the bearings be properly lubricated. This means that the lubricant must be of the right composition, it must be delivered at the right time and in the right quantity.

The prior art has many examples of metering means for a lubricant, but these are invariably complex systems which add to the cost of the equipment. Furthermore, it is axiomatic that the more complex the metering systems are, the more can go wrong with them. Another shortcoming of the prior art is that in some instances the hydraulic fluid and the lubricant were intermingled, thus reducing the efficiency of both.

The present invention comprises a pressure actuated cylinder having a hollow piston and a relief valve integral therewith. The hollow piston is filled with a lubricant suitable to the application of the particular bearing driven by the cylinder. When the piston is actuated by hydraulic fluid, the relief valve will be overcome at the pressure peak. The hydraulic fluid is then free to pass through the valve to act on one face of an axially movable plug member. The opposed face of the plug bears against the lubricant so as to discharge a small amount of lubricant into the bearing. The hydraulic fluid used to cycle the cylinder cannot mix with the lubricating medium because the plug is sealingly disposed therebetween. The plug, in effect, acts as a piston for the lubricant.

The purpose of the relief valve is to minimize the length of time that the lubricant is pressurized. In the normal use of hydraulic cylinders, a transient pressure peak exists for a very short duration of time. The magnitude of this pressure peak may be in the order of one and one-half times the normal cylinder operating pressure. The relationship of the pressure peak duration and the pressure required to overcome the relief valve is utilized in the present invention to momentarily inject a metered quantity of lubricant into the bearing. A passageway is machined in the rod end to interconnect the inside of the hollow, lubricant containing piston with the bearing surface. Proper metering during the cylinder pressure peak will appreciably extend the useful supply of lubricant. A metering orifice may also be used in conjunction with the present invention to further control the supply of lubricant.

An advantage of the present invention is that the bearings are lubricated only when the machine is being used. Conversely the necessary lubrication cannot be overlooked or forgotten. Another advantage of the present invention is that the lubricant is self contained within the cylinder's follower rod and is separated from the hydraulic fluid. Therefore, a lubricant may be used which is best suited for the type or function of the bearing.

Accordingly, it is an object of the present invention to provide an hydraulic cylinder having supply of lubricant contained in the hollow follower rod thereof.

An additional object of the present invention is to provide lubricant metering means that is intermittently actuated coincidentally with the pressure peak of the hydraulic cylinder in which it is contained.

Another object is to provide means to maintain the hydraulic fluid and the lubricant separate.

A feature of the present invention is the provision of a preset relief valve which must be opened by the hydraulic pressure peak before the lubricant can be metered.

An additional object is to include a metering orifice with the lubricant metering means of the present invention.

A feature of the present invention is that the lubricating means forcibly injects a lubricant into the bearings, only when the bearings are being used.

These and other features, objects and advantages of the invention will, in part, be pointed out with particularity and will, in part, become obvious from the following more detailed description of the invention, taken in conjunction with the accompanying drawing, which forms an integral part thereof.

In the various figures of the drawing like reference characters designate like parts.

In the drawing:

FIG. 1 is an end view of an hydraulic actuating cylinder employing the lubricant metering means of the present invention;

FIG. 2 is a longitudinal section taken along line 2—2 of FIG. 1 with a portion of the follower rod broken away;

FIG. 3 is an enlarged longitudinal detail in section showing the interior portion of the axially movable piston follower;

FIG. 4 is a longitudinal section illustrating an embodiment of the present invention suitable as a standard component to be used with a range of pistons; and FIG. 5 is a longitudinal section illustrating an alternative, threadably removable metering orifice.

Referring now to the drawings, hydraulic cylinder 10 is comprised of a hollow body portion 12 having a pin-eye or hinge type mount 14 at one end for pivotal connection to a support member such as a clevis. At its opposite end, body portion 12 is provided with external threads 16 so that end fitting 18 may be secured thereto and retained by nut 20.

Prior to assembly of end fitting 18, assembly 22 is inserted into the hollow cylinder body portion 12. Assembly 22 is provided with a follower 24 and a follower rod 26 having a central bore 28. The follower has an annular groove 27 on the outside surface thereof which retains O-ring 29. In this manner, a sliding seal is maintained between the inside diameter of the cylinder and the follower. The opposite end or follower rod of the assembly, which is of substantially smaller diameter than the follower, is slidably movable through bore 30 formed in end fitting 18. Suitable sealing means such as O-ring 32 and 33 are provided in end fitting 18 to maintain the inner portion of the cylinder body sealed with respect to the atmosphere.

Assembly 22 is hollow, the purpose of which will be explained more fully hereinafter, and is provided with internal threads 34 at the end thereof opposite head 24. A hollow rod end 36 having a central bore 38 and external threads 40 is threadably secured to the external end of assembly 22 and retained thereon by nut 42. In the particular embodiment illustrated (FIG. 2) the rod end is comprised of a spherical bearing 44, and a captured bearing socket or race 46 which is provided with a number of radial apertures 48. Central bore 50, formed in bearing 44 is bored and honed to standard diameters to accommodate the desired shaft or stud of the utilization apparatus. Metering orifice 52 is also formed in the rod end, coaxial to and as an extension of bore 38 so that the internal portion of assembly 22 is in communication with the confronting surfaces of bearing 44 and race 46. O-ring 54 provides sealing between the bore of the assembly and the rod end.

The internal configuration of the assembly 22 is illustrated on an enlarged scale in FIG. 3. The relief valve, generally designated as 60, is contained within assembly 22, proximate follower 24 thereof and is comprised of a valve seat 62 having a central opening 64, an elongated cage member 66 having a flanged end 68 and an apertured end 70, a ball 72 seated in the valve seat central opening, a ball retainer 74 and a biasing member in the form of a compression spring 76. It will be seen in FIG. 3 that the flanged end of cage member 66 is positioned in a seat portion 78 formed in the follower of the assembly and that the base of the valve seat bears against the cage flange. Thus, in conjunction with retaining ring 80 which is retained in annular groove 81, the relief valve is constrained from axial motion.

A second axially movable follower 82, snugly fitted in bore 28 of follower rod 26, has two opposed, transverse faces 84 and 86, as well as a circumferential sealing ring 88 disposed in annular groove 90. Initially, second follower 82 is positioned proximate relief valve 66 as shown in solid lines and the remainder of the bore in follower rod 26, up to rod end 36, is filled with a suitable lubricant, shown schematically as 92. It will be seen in FIG. 3 that plug face 84 confronts relief valve cage member 66 and plug face 86 is in contact with the lubricating medium. Effectively then, the second follower forms an axially movable sealing barrier between the hydraulic fluid and the lubricant.

Cylinder body 12 is provided with two internally threaded ports 94 and 96 which are in communication with bore 28 via channels 98 and 100, respectively, and with faces 24a and 24b, respectively, of follower 24. Thus, pressurized hydraulic fluid entering through port 98 and acting on face 24a will move the follower rod to the right as seen in the drawings. Pressurized hydraulic fluid entering through port 100 and acting on face 24b will move the follower rod to the left. When the hydraulic fluid entering port 94 exceeds a particular pressure, that is, when it reaches its peak pressure, ball 72 will be moved to the right compressing carefully calibrated spring 76. The hydraulic fluid will pass through opening 64 in valve seat 62 and then flow through cage member 66 to bear against face 84 of second follower 82. Hydraulic pressure will move second follower 82 to the right (FIG. 3) forcing lubricant 92 through bore 38 and metering orifice 52 in rod end 36. Thus, lubricant will be delivered to the bearing surfaces in a metered quantity only when the hydraulic pressure reaches a peak which can overcome the relief valve. It will be appreciated that, as the first follower is returned to the left (FIG. 2) by hydraulic fluid entering through port 96, the second follower 82 will remain in position since there is no longer an axial force on it. On the next stroke of the piston, the hydraulic fluid will again overcome the relief valve at the momentary pressure peak. As explained hereinabove, the hydraulic fluid will again come to bear against face 84, thus moving the second follower 82 further to the right. This will, of course, mean that another metered quantity of lubricant is delivered under pressure to the bearing.

It is also within the spirit of this invention to provide an adapter to convert a standard design hydraulic piston to incorporate the lubricant metering device of this invention. In this embodiment, follower 100 and hollow follower rod 102 are fabricated as separate components which are releasably secured to each other by thread means 104. Locknut or jamb nut 106 provides positive locking between members 100 and 102 although it should be understood that other means may be employed, such as a deformable insert disposed in the thread means or safety wire between nut 106 and follower 100 as would be common in an aircraft installation. To assure proper sealing, an O-ring 108 is interposed between two abutting surfaces of follower 100 and follower rod 102.

Follower rod 100 is bored out and internally threaded at 110 to releasably receive externally threaded valve seat 62'. With the exception of the valve seat, all other components of the valve are the same in construction and function as the valve illustrated in FIG. 2 and therefor need not be described again. Sealing is provided between follower 100 and valve seat 62' by means of O-ring 112. It will be seen then that by axially moving the valve seat, utilizing threads 110, the loading of the valve spring may be varied and a measure of adjustment achieved. This will, of course, directly affect the time at which the valve will respond to the fluid pressure.

It should also be understood that, where practical, such as on a relatively short assembly, a unitary follower and solid follower rod may be converted to provide lubricant metering means by boring out both the follower and the follower rod. To provide a variable setting for the valve, it would be necessary to thread the follower and the valve seat as described hereinabove.

In any case, the interior of the hollow rod end is in communication with the lubricant storing interior of the follower rod so that the lubricant may be delivered to the bearing at the momentary pressure peak of the hydraulic cylinder.

FIG. 5 illustrates an alternative metering orifice arrangement that in some respects is less expensive to fabricate than that shown in FIG. 2. Rod end 36' is once again provided with a central bore 114 which has a reduced diameter extension 114a. The extension portion of the central bore does not act as a metering orifice because of its relatively large size and requires less costly and accurate machinery.

Counterbore 116 is provided at the end of threaded rod end to accommodate a threaded metering plug 118. Axial orifice 120 is provided at one end of the metering plug whereby communication is achieved between the central bore of the metering plug and the rod end bearing through bore extension 114a. Thus, it will be seen that the lubricant may be delivered from the interior of the hollow follower rod to the bearing via a metering orifice interposed therebetween. The metering plug is externally threaded to mate with internal threads of the hollow follower rod. The metering orifice may thereby be readily changed should a different size orifice be required for a different application such as a more or less viscous lubricant. Sealing members such as O-rings 124 and 126 are provided, respectively, between metering plug 118 and the internal bore of the hollow follower rod 102, as well as between metering plug 118 and rod ends 36' in the counterbore end 116 thereof.

It should be understood that any one or more of the features or alternative arrangements of FIG. 4 and FIG. 5 may readily be included in the embodiment illustrated in FIG. 2 without departing from the spirit of the invention.

The lubricant metering apparatus described above contains a minimum of parts over and above those required by the hydraulic cylinder itself. Consequently, the likelihood of malfunction is minimized and the cost of the cylinder is not greatly increased. The metering apparatus is self contained within the cylinder making the replenishing of the lubricant extremely simple. Since each cylinder contains a complete metering system by itself, it is quite convenient to have different grades or types of lubricant in each cylinder so that the different requirements of each bearing may be accurately satisfied. Furthermore, should there be a breakdown in any one lubricant metering system, all the other bearings in the machine would not be effected since they are all independently lubricated from each cylinder.

From the description given above, taken in conjunction with the drawings it will be seen that the hydraulic fluid and the lubricant are maintained separate, thereby avoiding contamination of either one. Furthermore, only a controlled and predetermined amount of lubricant is delivered to the bearings. This is done only when the machine is running and even then only at specific and predetermined times, that is, when the hydraulic cylinder reaches its momentary and transient pressure peak.

There has been disclosed heretofore the best embodiments of the invention presently contemplated and it is to be understood that various changes and modifications may be made by those skilled in the art without departing from the spirit of the invention.

What is claimed is:

1. Lubricant metering means for a hollow rod end bearing comprising:
   (a) an actuating cylinder arranged to actuate the rod end, said cylinder having a pair of inlet ports for pressurized actuating fluid, said ports being disposed proximate each end of said cylinder in communication with the interior thereof;
   (b) an assembly comprising a hollow follower and a first hollow follower rod, said assembly being slidably disposed within said cylinder intermediate said ports whereby said assembly may be moved axially under the influence of the pressurized actuating fluid, said first follower rod being secured to the rod end, said first follower rod having therein a chamber for the storage of lubricant;
   (c) a normally closed relief valve disposed within said hollow follower, said valve being intermediate and in communication with one of said inlet ports and the interior of said first follower rod whereby when the pressure of the actuating fluid exceeds a predetermined value, said valve will open to permit the passage therethrough of the actuating fluid; and
   (d) a second follower rod sealingly disposed in said hollow first follower rod intermediate said valve and the lubricant, said second follower rod being axially movable in said first follower rod under the influence of the pressurized actuating fluid when said relief valve is open.

2. The apparatus of claim 1 wherein said relief valve comprises:
   (a) a valve seat secured within said follower, said valve seat having a central opening therein;
   (b) a closure member removably seated in said valve seat central opening;
   (c) biasing means urging said closure member into said valve seat central opening; and
   (d) a cylindrical, cup shaped cage having a radially extending flange at one end and having an apertured end opposite said flanged end, said biasing means being captured within said cage between said valve seat and said apertured end of said cage.

3. Apparatus for automatically lubricating a bearing comprising:
   (a) a rod end which rotatably captures the bearing at one end thereof, said rod end having a central bore therethrough, said bore communicating with the bearing;
   (b) an actuating cylinder arranged to actuate the rod end, said cylinder having a pair of inlet ports for pressurized actuating fluid, said ports being disposed proximate each end of said cylinder in communication with the interior thereof;
   (c) an assembly comprising a hollow follower and a hollow first follower rod, said assembly being slidably disposed within said cylinder intermediate said ports whereby said assembly may be moved axially under the influence of the pressurized actuating fluid, said first follower rod being secured to the rod end, said first follower rod having therein a chamber for the storage of lubricant;
   (d) a normally closed relief valve disposed within said hollow follower, said valve being intermediate and in communication with one of said inlet ports and the interior of said first follower rod whereby when the pressure of the actuating fluid exceeds a predetermined value, said valve will open to permit the passage therethrough of the actuating fluid; and
   (e) a second follower rod sealingly disposed in said hollow first follower rod intermediate said valve and the lubricant, said second follower rod being axially movable in said assembly under the influence of the pressurized actuating fluid when said relief valve is open.

4. The apparatus of claim 3 wherein said rod end central bore includes a metering orifice proximate the bearing.

5. An actuating cylinder for injecting a lubricant into a hollow rod end bearing comprising:
   (a) a hollow body member having a pair of inlet ports for pressurized actuating fluid, said ports disposed proximate each end of said body member in communication with the interior thereof;
   (b) a hollow assembly slidably disposed in said body member intermediate said ports, the hollow interior of said assembly having therein a chamber for the storage of lubricant;
   (c) a normally closed relief valve disposed intermediate one of said inlet ports and one end of said assembly; and
   (d) a follower rod sealingly disposed within the chamber, said assembly intermediate said valve and the lubricant, the hollow rod end and bearing being attached to said assembly on the lubricant side of said follower rod.

6. Lubricant injection apparatus for bearings comprising:
   (a) a hollow axially movable first follower containing a lubricant;
   (b) a second follower sealingly disposed in said first follower, said second follower having first and second opposed faces, said second follower first face being arranged to bear against the lubricant;
   (c) a normally closed relief valve disposed within said first follower proximate said second face of said second follower;
   (d) a hollow rod end having a bearing captured at one end thereof, said rod end being secured to one end of said first follower whereby the lubricant contained in said first follower is in communication with the bearing; and
   (e) actuating means to axially move said first follower and to intermittently overcome said relief valve at predetermined times to thereby force said second follower against the lubricant to deliver the lubricant to the bearing.

7. Lubricant injection apparatus for a bearing captured in a hollow rod end, the injection apparatus comprising:
   (a) a hollow axially movable first follower containing a lubricant;
   (b) a second follower sealingly disposed in said first follower, said second follower having first and second opposed faces, said first face of said second follower being arranged to bear against the lubricant;
   (c) a normally closed relief valve disposed within said first follower proximate said second face of said second follower; and
   (d) actuating means to axially move said first follower and to intermittently overcome said relief valve at predetermined times to thereby force said second follower against the lubricant to deliver the lubricant to the bearing.

8. Lubricant injection apparatus for a bearing captured in a hollow rod end, the injection apparatus comprising:
(a) a hollow axially movable first follower containing a lubricant;
(b) a second follower sealingly disposed in said first follower, said second follower having first and second opposed faces, said first face of said second follower being arranged to bear against the lubricant; and
(c) a normally closed relief valve disposed within said first follower proximate said second face of said second follower.

9. Lubricant metering means for use within an actuating cylinder arranged to actuate a hollow rod end having a rotatably captured bearing, the cylinder having a pair of inlet ports for pressurized actuating fluid, the cylinder further having a hollow, lubricant filled first follower connected to the rod end, the first follower being axially slidable between the inlet ports, said metering means comprising:
(a) a normally closed relief valve disposed within the hollow first follower, said valve being intermediate and in communication with one of the inlet ports and the interior of the first follower whereby when the pressure of the actuating fluid exceeds a predetermined value, said valve will open to permit the passage therethrough of the actuating fluid; and
(b) a second follower sealingly disposed in the hollow first follower intermediate said valve and the lubricant, said second follower being axially movable within the first follower under the influence of the pressurized actuating fluid when said relief valve is open.

10. The apparatus of claim 9 wherein said relief valve comprises:
(a) a valve seat having a central opening;
(b) a closure member movably seated in said valve seat opening;
(c) biasing means urging said closure member into said valve seat central opening; and
(d) cylindrical, cup shaped cage having a radially extending flange at one end and having an apertured end opposite said flanged end, said biasing means being captured within said cage between said valve seat and said apertured end of said cage.

11. The apparatus of claim 10 including adjustment means whereby said valve seat may be axially repositioned with respect to said cage.

References Cited by the Examiner
UNITED STATES PATENTS

| | | | |
|---|---|---|---|
| 1,493,049 | 5/1924 | Mitchell | 222—389 X |
| 1,609,015 | 11/1926 | Engbrecht | 222—389 X |
| 1,696,737 | 12/1928 | Scoville | 184—39 |

FOREIGN PATENTS 914,348  6/1946  France.

LAVERNE D. GEIGER, *Primary Examiner.*

H. BELL, *Assistant Examiner.*